C. C. TITUS & W. J. BARENSCHEER.
PROCESS OF TREATING ORES.
APPLICATION FILED NOV. 15, 1912.
1,069,498.
Patented Aug. 5, 1913.
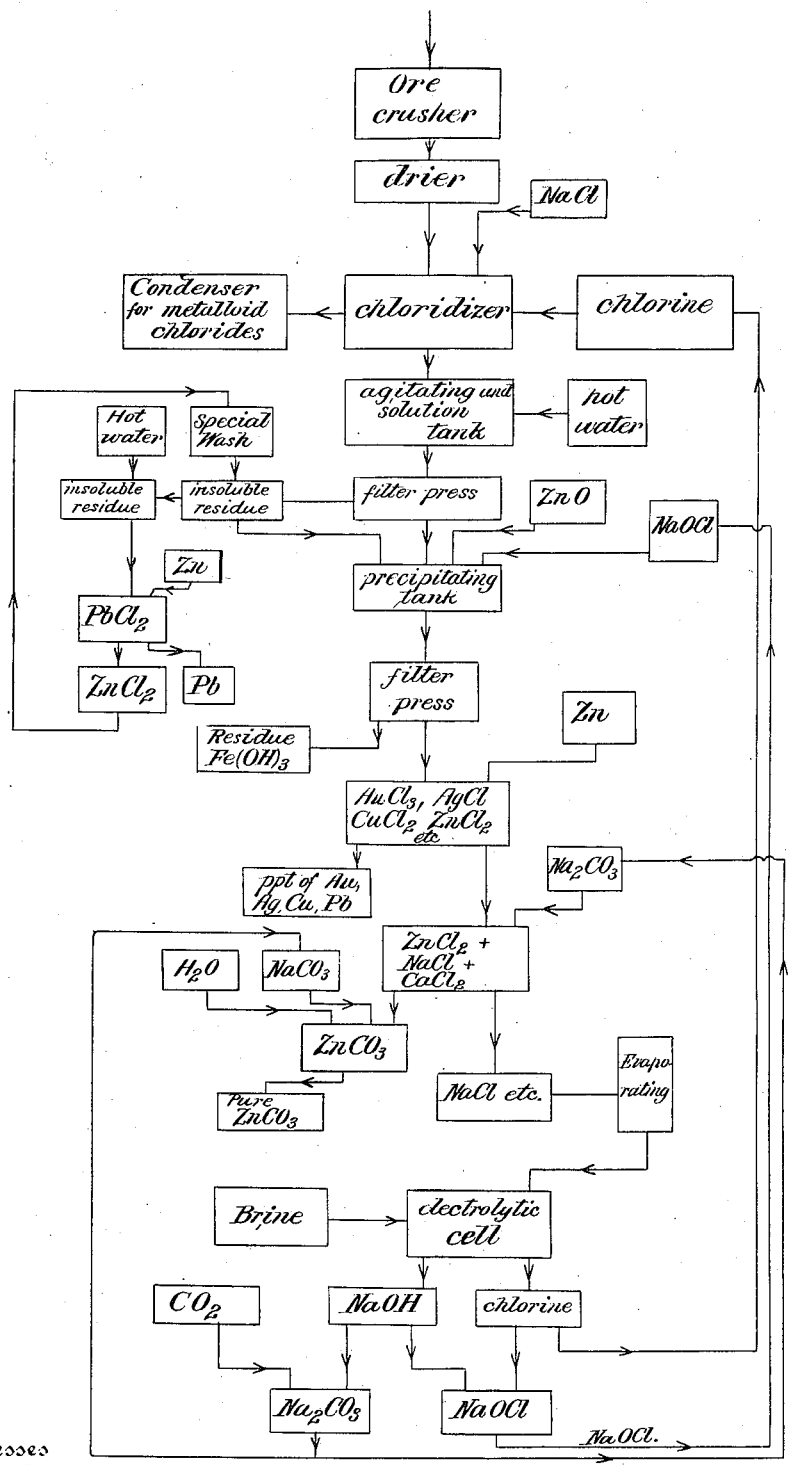

UNITED STATES PATENT OFFICE.

COURT C. TITUS AND WILLIAM J. BARENSCHEER, OF HELENA, MONTANA, ASSIGNORS TO NEW ENGLAND ELECTRO-CHEMICAL METALS COMPANY, OF BOSTON, MASSACHUSETTS, A CORPORATION OF MAINE.

PROCESS OF TREATING ORES.

1,069,498.  Specification of Letters Patent.  Patented Aug. 5, 1913.

Application filed November 15, 1912. Serial No. 731,507.

*To all whom it may concern:*

Be it known that we, COURT C. TITUS and WILLIAM J. BARENSCHEER, citizens of the United States, residing at Helena, in the county of Lewis and Clark and State of Montana, have invented certain new and useful Improvements in Processes of Treating Ores, of which the following is a specification.

This process is especially designed for the treatment of complex or refractory ores, such as those containing, in addition to gold, silver, lead and copper, a relatively large proportion of zinc and iron, and some manganese, together with sulfur, arsenic and antimony.

The process, generally stated, consists in subjecting the crushed ores to the action of chlorin gas while heated to a temperature sufficient to cause the metallic ingredients of the ore to combine with the chlorin to form chlorids, from which, by suitable treatment the various metals can be obtained. We are aware that such a process is not broadly new (see U. S. Patent No. 607,287, Sinding-Larsen, July 12, 1898, and Patent No. 739,374, Baker and Burwell, September 22, 1903); and our invention relates to an improvement on these prior processes.

By our improved method, the relatively large zinc-content of these complex sulfid ores, which has heretofore been a serious obstacle to their economical treatment, is recovered as a zinc-carbonate; the gold, silver, lead and copper are obtained as precipitates in condition for direct melting into bullion; and the iron and manganese as precipitates, containing small amounts of gold, silver, copper and lead, which have a commercial value in the lead-smelting process.

The chlorin gas is preferably obtained by electrolysis of common salt, the caustic-soda produced being utilized wholly or in part in the process, and the chlorin recovered either as hydrochloric acid or in the form of salt solution ready for reuse in the electrolytic cells. Our process is therefore, in the main, one for the recovery of zinc, and is conducted with that end in view. Thus an ore product of the following composition has been successfully treated. Zinc, 16%, copper, 0.5%, iron, 10%, lead, 3.1%, sulphur, 13.9%, manganese, 1.4%, arsenic, 1.55%, antimony, 0.25%, together with silver, 7 ounces and gold, 0.12 ounce to the ton.

The drawing shows diagrammatically the mode of procedure.

According to the preferred method of carrying out the process, the ore is crushed not finer than one-eighth of an inch maximum size, the coarseness of the ore greatly facilitating the subsequent lixiviation and washing of the gangue. The thoroughly dried ore is then mixed with about five per cent by weight of common salt, and the mixture delivered into a revolving iron cylinder which is externally heated to a temperature of about 325° C. A current of dry chlorin gas is introduced into the heated and revolving cylinder, whereby the chlorin gas is brought into intimate contact with the crushed ore. As the result of the ensuing reaction, there are formed combinations of chlorin and the metalloids, such as sulfur, arsenic and antimony, which are volatile and pass off to a condenser, and combinations of chlorin and the metals present in the ore. The treatment is carried on for from four to five hours, until approximately all the lead, copper, silver, gold, and zinc have been chloridized, variable amounts, usually about 60% of the iron and manganese, if present, also being converted into chlorids. The externally-applied heat, together with that produced by the reaction is sufficient to produce, from an ore of the kind described, a very fluid molten mass or melt of fusible chlorids carrying the infusible ingredients and gangue in suspension.

The reactions may be roughly indicated in the following equation, in which no attempt has been made to state the coefficients:

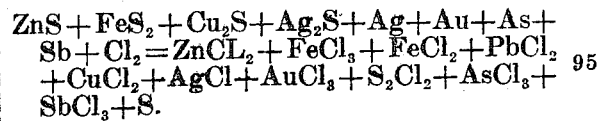
$ZnS + FeS_2 + Cu_2S + Ag_2S + Ag + Au + As + Sb + Cl_2 = ZnCl_2 + FeCl_3 + FeCl_2 + PbCl_2 + CuCl_2 + AgCl + AuCl_3 + S_2Cl_2 + AsCl_3 + SbCl_3 + S$.

The contents of the chloridizer are discharged directly into an agitating tank having a filter bottom, and containing a suitable amount of hot water, and agitation is continued until the solution is complete.

The acid solution thus produced is drawn off, passed through a filter-press, and delivered, still hot, to a tank in which the iron and manganese are precipitated. As a precipitant we may use raw carbonate or silicate zinc ores, or sweet roasted zinc sulfid ores or concentrates, in conjunction with a soluble hypochlorite, the ore, ground to about 30 mesh or finer being preferably added in slight excess. The solution, kept at boiling heat is constantly agitated, and upon the addition of sodium hypochlorite solution, the iron and manganese are precipitated as hydrates, the reactions being roughly indicated by the following equation:

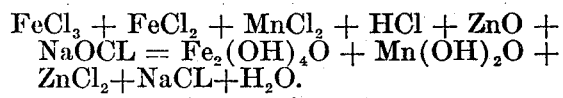

Upon filtration of the solution, there is obtained a precipitate containing the iron and manganese hydrates, which carry also small quantities of lead, silver, gold, copper and zinc. This precipitate has a commercial value in lead-smelting processes.

The insoluble residue left in the first solution tank is washed first with a special solution to remove all the iron and zinc, and then washed with hot water to dissolve the lead-chlorid. From this solution the lead is precipitated by metallic zinc, and the filtrate used as the special solution above referred to. The precipitated lead is melted into bars and is ready for refining. After the removal of the iron and manganese, metallic zinc is added to the now nearly neutral solution, and the gold, silver, lead, copper, etc., are precipitated. The precipitate is melted and cast into bars of base bullion. The filtrate from the preceding operation now contains the zinc chlorid together with chlorids of calcium, magnesium and sodium. To recover the zinc, the filtrate, kept at a boiling heat, is agitated and a hot solution of carbonate of soda is run in gradually until all the zinc is precipitated as a zinc carbonate, the calcium and magnesium chlorids remaining in solution. After filtration, the precipitate is thoroughly washed with water, followed by a wash of hot sodium carbonate to remove any sulfates. After further washing with hot water, a practically pure basic carbonate of zinc remains, which may be used as such or calcined to form zinc oxid. The common salt solution remaining is returned to the brine tanks for reuse. The gases and volatile products from the chloridizer, comprising chlorin, free sulfur, chlorids of sulfur, antimony and arsenic, are passed through a condensing chamber in which the chlorid of sulfur is condensed, the residual gases being delivered to a tower, where they may be washed and recovered for future use, or otherwise disposed of.

We prefer to use chlorin generated by electrolysis of common salt, since the caustic solution from the electrolytic cells may be used to manufacture the carbonate of soda and sodium hypochlorite used as reagents.

It is to be understood that the iron and manganese react together, and that where the claims refer to the precipitation of iron, that of manganese, if present in the ore, is also included. It is further to be understood that while we have given a specific example of an ore product which has been successfully treated by our process, the process is applicable to ores and ore products of composition varying widely from that of this particular ore.

We claim:

1. A process for the treatment of sulfid ores containing zinc and other metals, which consists in coarsely grinding the ore, mixing the raw ground ore with common salt, and subjecting the mixture while heated to the action of chlorin gas, whereby all the metallic ingredients are rendered soluble.

2. A process for the treatment of sulfid ores containing zinc and other metals, which consists in coarsely grinding the ore, mixing the ground ore with common salt, and subjecting the mixture while heated between the melting and volatilizing points of zinc chlorid to the action of chlorin gas, whereby all the metallic ingredients are rendered soluble.

3. A process for the treatment of sulfid ores containing a metal whose chlorid is readily fusible, which consists in subjecting the ore while heated to the action of chlorin gas under such conditions of temperature as to produce a fluid melt containing the chloridized metals.

4. A process for the treatment of sulfid ores containing a metal whose chlorid is readily fusible, which consists in subjecting the ore, mixed with a flux, while heated to the action of chlorin gas under such conditions of temperature as to produce a fluid melt containing the chloridized metals.

5. A process for the treatment of sulfid ores containing a metal whose chlorid is readily fusible, which consists in subjecting the ore, mixed with a chlorid flux, while heated to the action of chlorin gas under such conditions of temperature as to produce a fluid melt containing the chloridized metals.

6. A process for the treatment of sulfid ores containing a metal whose chlorid is readily fusible, which consists in subjecting the ore, mixed with sodium chlorid, while heated to the action of chlorin gas under such conditions of temperature as to produce a fluid melt containing the chloridized metals.

7. A process for the treatment of sulfid ores containing a metal whose chlorid is readily fusible, which consists in subjecting the coarsely ground ore while heated and agitated to the action of chlorin gas under such conditions of temperature as to produce a fluid melt containing the chloridized metals.

8. A process for the treatment of sulfid ores containing zinc and other metals, which consists in subjecting the ore at a temperature above the melting-point of zinc chlorid to the action of chlorin gas, and producing thereby a fluid melt containing the chloridized metals.

9. A process for the treatment of sulfid ores containing zinc and other metals, which consists in subjecting the ore while agitated and at a temperature between the melting-point and the volatilizing point of zinc chlorid to the action of chlorin gas, and producing thereby a fluid melt containing the chloridized metals.

10. A process for the treatment of sulfid ores containing zinc and other metals, which consists in subjecting the coarsely-ground ore while agitated and at a temperature above the melting-point of zinc chlorid to the action of chlorin gas, and producing thereby a fluid melt containing the chloridized metals.

11. A process for the treatment of sulfid ores containing zinc and other metals, which consists in subjecting the ore, mixed with a flux, at a temperature above the melting-point of zinc chlorid to the action of chlorin gas, and producing thereby a fluid melt containing the chloridized metals.

12. A process for the treatment of sulfid ores containing zinc and other metals, which consists in subjecting the ore, mixed with a chlorid flux, at a temperature above the melting-point of zinc chlorid to the action of chlorin gas, and producing thereby a fluid melt containing the chloridized metals.

13. A process for the treatment of sulfid ores containing zinc and other metals, which consists in subjecting the coarsely-ground ore, mixed with a flux, while agitated and at a temperature above the melting-point of zinc chlorid to the action of chlorin gas, and producing thereby a fluid melt containing the chloridized metals.

14. A process for the treatment of sulfid ores containing zinc and other metals, which consists in coarsely grinding the ores, subjecting the ground ore while heated and agitated to the action of chlorin to convert the metallic ingredients into soluble compounds, dissolving the thus-formed chlorids, and recovering the metals from such solutions.

In testimony whereof we affix our signatures in presence of two witnesses.

COURT C. TITUS.
WILLIAM J. BARENSCHEER.

Witnesses:
MARCUS L. HEWETT,
HENRY A. NASH.